Figure 1:
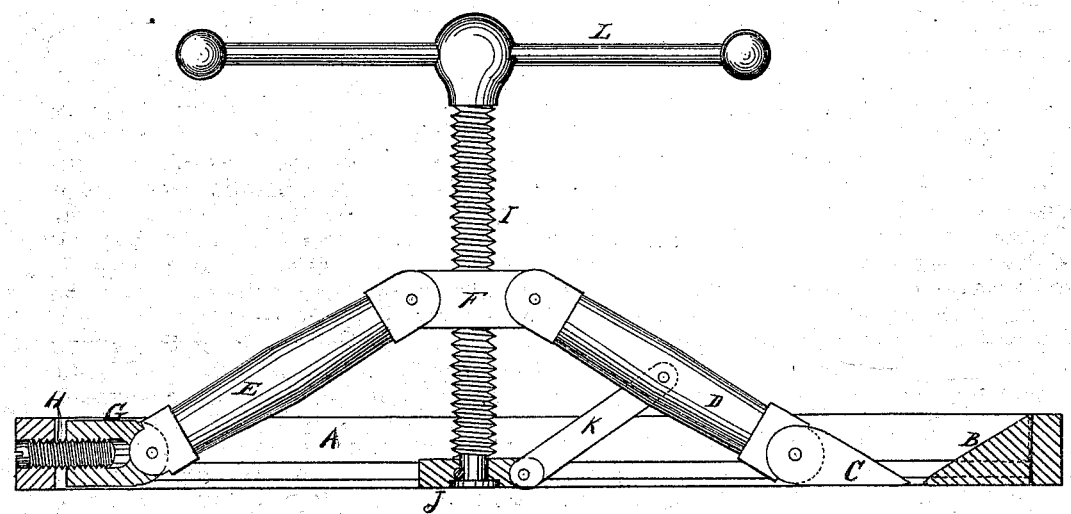

L. I. CHAPMAN.
Bolt-Cutters.

No. 135,887.            Patented Feb. 18, 1873.

Witnesses

UNITED STATES PATENT OFFICE.

LEONARD J. CHAPMAN, OF VALLEJO, CALIFORNIA.

IMPROVEMENT IN BOLT-CUTTERS.

Specification forming part of Letters Patent No. 135,887, dated February 18, 1873.

*To all whom it may concern:*

Be it known that I, LEONARD J. CHAPMAN, of Vallejo, Solano county, State of California, have invented a Bolt-Cutter; and I do hereby declare the following description and accompanying drawing are sufficient to enable any person skilled in the art or science to which it most nearly appertains to make and use my said invention without further invention or experiment.

My invention relates to certain improvements in machines for cutting bolts; and it consists mainly in the construction of a mechanism by which the ends of bolts, and more particularly where they project in the fastenings of vessels, can be easily cut off, whatever may be their position and direction. This is effected by means of two cutters, one of which is stationary at the end of a pair of ways, while the other cutter is moved forward and back between the ways by means of a screw and lever, operating in turn upon a species of knee-lever. My invention further consists in the employment of a novel parallel-motion device by which the screw is carried along with the levers and maintained in its true position in the nut as the cutter is operated, so that it will not become broken or cramped.

Referring to the accompanying drawing for a more complete explanation of my invention, Figure 1 is a side elevation with a section of a part of the machine.

A A are a suitable pair of ways united at their ends, and having a cutter, B, made stationary at one end; or, it may be so made as to slide out easily, as shown, for the purpose of sharpening. Another cutter, C, is fitted to slide within the ways, and has its cutting-edge toward the edge of the cutter B. To the back of the cutter C is attached by a hinge-joint a bar, D. This bar and a similar bar, E, from the opposite end of the ways are hinged to the nut F, as shown, so as to form a knee-lever. The outer end of the bar E is attached to the block or nut G, which slides in the ways at the opposite end from the cutters, and a screw, H, or other suitable device, serves to adjust the whole device to or from the stationary cutter. The operating-screw I passes through the nut F, and its lower end is fitted to revolve loosely without advancing in the slide J, which also moves in the ways A A for the purpose of allowing the screw I to advance and recede with the motion of the cutter C. In order to maintain the screw in a vertical position to the nut F as the latter changes its position by the operation of the levers, I employ a connecting-rod, K, which extends from the slide J to the middle of the rod or bar D, being jointed to each, as shown, so that it moves the slide J and produces a parallel motion of it and the nut F. By this arrangement the screw will never become cramped, but will work freely in any position. A short lever, L, passes through the head of the screw, and the cutter is operated by the combined powers of the lever-screw and the knee-lever, thus giving a most powerful device for cutting off bolts, and one which from its small size—not exceeding thirty inches in length—can be used in almost any position that is necessary.

My invention will be found very useful for carriage-makers, and for work on ship-board, where there are many bolts of all sizes to be cut off.

Having thus described my invention, what I claim as new, and desire to secure by Letters Patent, is—

1. The cutters B and C, with their operating-levers D and E, the nut F, and screw I, together with the adjusting-block G and the guiding-ways A A, substantially as and for the purpose described.

2. In combination with the operating-levers D and E and the nut F, the slide J and connecting-rod K for preserving the screw I in its vertical position in the nut, substantially as herein described.

In witness whereof I hereunto set my hand and seal.

LEONARD J. CHAPMAN. [L. S.]

Witnesses:
JOHN L. BOONE,
C. M. RICHARDSON.